(12) United States Patent
Migdal et al.

(10) Patent No.: US 11,501,316 B2
(45) Date of Patent: Nov. 15, 2022

(54) FRAUDULENT ACTIVITY DETECTION AT A BARCODE SCANNER BY VERIFYING VISUAL SIGNATURES

(71) Applicant: NCR Corporation, Atlanta, GA (US)

(72) Inventors: Joshua Migdal, Wayland, MA (US); Malay Kundu, Lexington, MA (US)

(73) Assignee: NCR Corporation, Atlanta, GA (US)

( * ) Notice: Subject to any disclaimer, the term of this patent is extended or adjusted under 35 U.S.C. 154(b) by 50 days.

(21) Appl. No.: 17/084,078

(22) Filed: Oct. 29, 2020

(65) Prior Publication Data
US 2021/0042761 A1 Feb. 11, 2021

Related U.S. Application Data

(63) Continuation of application No. 16/293,857, filed on Mar. 6, 2019, now Pat. No. 10,825,027, which is a continuation of application No. 15/871,053, filed on Jan. 14, 2018, now Pat. No. 10,255,605, which is a continuation of application No. 14/591,883, filed on Jan. 7, 2015, now Pat. No. 9,870,565.

(60) Provisional application No. 61/924,679, filed on Jan. 7, 2014.

(51) Int. Cl.
*G06K 9/00* (2022.01)
*G06Q 30/00* (2012.01)

(52) U.S. Cl.
CPC .................. *G06Q 30/018* (2013.01)

(58) Field of Classification Search
CPC ............ G06K 9/18; G06K 9/00; G06K 9/344; G06K 9/00442; G06K 9/2054; G06K 9/00671; G06K 9/4652; G06K 9/00523; G06K 9/6202; G06K 7/1447; G06K 9/00449; G06K 9/00456; G06K 9/00624; G06K 9/00771; G06K 9/228
See application file for complete search history.

(56) References Cited

U.S. PATENT DOCUMENTS

| | | | | |
|---|---|---|---|---|
| 2005/0060055 A1* | 3/2005 | Hallowell | ............... | G07D 11/50 700/95 |
| 2010/0110183 A1* | 5/2010 | Bobbitt | .................. | G06V 10/25 382/103 |
| 2010/0163632 A1* | 7/2010 | Tseng | ..................... | G06V 10/25 235/494 |
| 2010/0327060 A1* | 12/2010 | Moran | ................... | G07D 7/128 235/440 |
| 2014/0201094 A1* | 7/2014 | Herrington | ............ | G06V 20/80 705/317 |

* cited by examiner

*Primary Examiner* — Alex Kok S Liew

(74) *Attorney, Agent, or Firm* — Schwegman, Lundberg & Woessner

(57) ABSTRACT

System and method for detecting a fraudulent activity at a barcode scanner is disclosed. The method issues an alert when the fraudulent activity is confirmed by comparing the visual signature of the item being transacted over the checkout terminal to the model visual signature. The model visual signature is obtained by averaging the collection of visual signature of the item gathered over a period of time. A human validation via a remote processor is employed to confirm the fraudulent activity verified by a computer.

20 Claims, 10 Drawing Sheets

FRAUDULENT ACTIVITY DETECTION AT A BARCODE SCANNER BY VERIFYING VISUAL SIGNATURES

CROSS-REFERENCE TO RELATED APPLICATIONS

This application is a continuation utility patent application which application claims priority to U.S. patent application Ser. No. 16/293,857 filed Mar. 6, 2019 which claims priority to U.S. patent application Ser. No. 15/871,053 filed Jan. 14, 2018, which claims priority to U.S. patent application Ser. No. 14/591,883 filed on Jan. 7, 2015, which claims benefit of provisional 61/924,679 filed on Jan. 7, 2014, the benefit of priority of each of which is claimed hereby, and each of which are incorporated herein in its entirety.

BACKGROUND

Field of the Invention

The present invention relates generally to a security system and method to prevent fraudulent activities occurring at a checkout terminal. More particularly, it relates to a method and system for detecting a fraudulent activities using a barcode scanner and a camera. The present invention, in part, provides a solution to detect a fraudulent activity known as "ticket switching".

Description of Related Art

Retailer lose billions of dollars annually due to the theft and improper scanning of the merchandise they are selling. This can occur in numerous ways, due to both employees stealing from the retailers as well as due to customers stealing. Of all the methods used which result in loss to the retailer, a significant portion occurs at the checkout itself. Improper scanning, "sweethearting", leaving items unscanned in carts and shopping baskets are just some of the ways in which customers and cashiers alike contribute to inventory "shrinkage" which results in a loss for the retailer.

One way in particular that a cashier or a customer can engage in fraudulent activity is through a process called ticket switching. Ticket switching is the process of replacing the barcode of one item with a barcode of another item of lesser value. (This is enabled by means as simple as pre-printing the less expensive barcode on a sticker before entering the store.) For instance, one could replace the barcode on the box of an expensive cordless drill with the barcode of an inexpensive tool. Thus, when the item is rung up for sale, the less-priced item is recorded instead. If it is the customer engaging in the fraud, the customer may hope that the cashier does not notice the difference.

Likewise, a customer could use a self-checkout register and bypass that mode of uncertainty altogether. If it is the cashier engaged in the fraud, often in collusion with the customer, he or she may have various other ways of engaging in the act of ticket switching. They may have barcodes ready on the side which are scanned in place of the certain expensive items. For instance, in a grocery store, the cashier may wish to ring up an expensive meat item for a friend by scanning in an inexpensive item, like a can of beans, in place of the meat barcode. Likewise, a cashier may stick the barcode of an inexpensive item to his or her wrist such that the wrist barcode gets scanned while the cashier moves a more expensive item (with its barcode un-viewable by the scanner) across the scanner.

Such fraudulent activities significantly contribute to the inventory shrinkage and subsequent loss of revenue for retailers. Therefore, what is needed is a system and method that protects retailers' assets from inadvertent or deliberate loss by preventing a fraudulent activity at a barcode scanner.

SUMMARY

The subject matter of this application may involve, in some cases, interrelated products, alternative solutions to a particular problem, and/or a plurality of different uses of a single system or article.

In one aspect, a method for detecting a fraudulent activity at a checkout terminal is provided. The checkout terminal may comprise a computer. The method may begin with the computer detecting an item identifier number of an item from the barcode with a barcode scanner, where the barcode is affixed to the item. The barcode scanner may be in communication with the computer. Further, the camera may capture an image of the item and be positioned to take an image of the item. The camera may be in communication with the computer. The image capture by the camera may comprise the barcode and a surrounding of the barcode.

The method may carry on by the computer obtaining a visual signature from the image. Finally, the computer may determine a similarity between the visual signature and a model visual signature to verify the fraudulent activity, by comparing the visual signature obtained from the image to the model visual signature linked to the item identifier number. The model visual signature may represent an expected visual signature of the item, where the model visual signature is stored at a storage unit being accessible to the computer.

In another aspect, a checkout terminal for detecting a fraudulent activity is provided. The checkout terminal may comprise a computer, a barcode scanner, a camera, and a storage unit in communication with the checkout terminal via a network. The barcode scanner may be in communication with the computer and positioned to detect an item identifier number of an item from a barcode that is affixed to the item. The camera may be in communication with the computer and positioned to capture an image of the item, where the image comprises the barcode and a surrounding of the barcode.

The checkout terminal may be configured to obtain a visual signature from the image. Further, the checkout terminal may be configured to determine a similarity between the visual signature and a model visual signature to verify the fraudulent activity, by comparing the visual signature obtained from the image to the model visual signature linked to the item identifier number. The model visual signature may represent an expected visual signature of the item, where the model visual signature may be stored at the storage unit.

DETAILED DESCRIPTION

Figure 1:
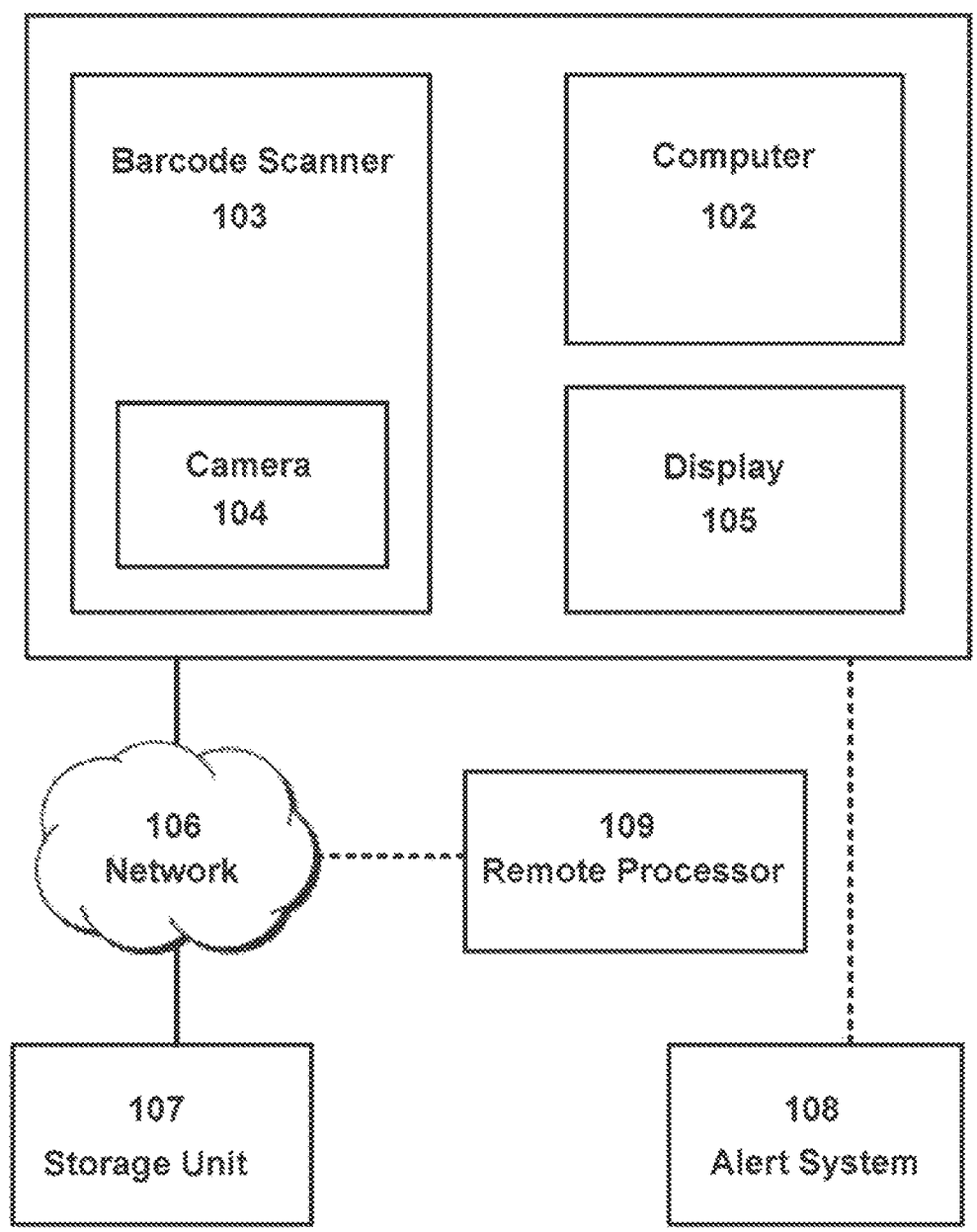
FIG. 1 provides an embodiment of the checkout terminal.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a system and method for detecting a fraudulent activity at checkout terminal having a barcode scanner. Specifically, the present invention provides a solution to detect and prevent a fraudulent activity commonly known as "ticket switching". Ticket switching is a process of replacing a barcode of an item with another barcode of another item of lesser value. Often times, the barcode of an item is altered by attaching another barcode of another item to cover up the existing barcode on the item. Thus ticket switching or barcode replacing still leaves other elements or features of the item intact to that item. For example, packaging of the item carries various visual features such as color, shape, and characters, in addition to the barcode.

As such, the present invention provides a system and method that detects the fraudulent activity (for example, ticket switching) by identifying a partial or substantial change of the item's visual features. The system and method provided herein may be employed to detect other similar types of fraudulent activity that may occur at the checkout terminal. The change can be verified by comparing the item's visual features linked to the barcode with the item's visual features obtained during a transaction of such item at the checkout terminal. Once the barcode is switched to another item, the corresponding visual features are likely to be altered, thus the present invention provides a system and method that is capable of detecting such changes by verifying the visual features of the item in question. Each of the items being scanned over the checkout terminal may be severally verified by the system and method provided herein.

Further, the present invention provides a system and method that provides alerts once the fraudulent activity is detected at the checkout terminal. The alerts may be given in many different ways which are disclosed in the following descriptions.

Camera contemplated herein may include, but are not limited to, DSLR, non-SLR digital cameras (e.g., but not limited to, compact digicams and SLR-like bridge digital cameras (also known as advanced digital cameras), and SLR-like interchangeable lens digital cameras), as well as video recorders (e.g., but not limited to, camcorders, analog cameras and IP cameras, and the like; a device that can provide a video feed of any duration, such as a DVR; a portable computing device having a camera, such as a tablet computer, laptop computer); and the like.

Storage unit contemplated herein may store data in the format including, but are not limiting to, XML, JSON, CSV, binary, over any connection type: serial, Ethernet, etc. over any protocol: UDP, TCP, and the like.

Image contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

Computer contemplated herein may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Barcode contemplated herein may be of any type of machine-readable medium, including but not limited to a barcode, a QR code, two-dimensional bar code, a prescribed font, optical character recognition (OCR) characters, Radio Frequency Identification (RFID), Near-Field Communication (NFC), Bluetooth technology, alphanumeric characters, non-alphanumeric characters, symbols, facial recognition and the like.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

Barcode scanner contemplated herein may include, but are not limited to, a laser-based scanner, an optical-based scanner, and the like.

Video contemplated herein may be any data format capable of being interpreted by a computer or computing device. Examples of image files contemplated herein include, but are not limited to MP4, AVI, MPG, M4V, FLV, MOV, WMV, VOB, and the like.

The system for detecting a fraudulent activity at a checkout terminal is provided. The system may comprise a camera, a barcode scanner, a computer with one or more processors, and a storage unit accessible by the computer via a network. The system may comprise one or more computers or computerized elements in communication working together to carry out the different functions of the system. The invention contemplated herein further may comprise non-transitory computer readable media configured to instruct a computer or computers to carry out the steps and functions of the system and method, as described herein.

In one embodiment, the system may be implemented with the checkout terminal. The checkout terminal for detecting a fraudulent activity may comprise a computer, a barcode scanner, a camera, and a storage unit.

The barcode scanner may detect an item identifier number of an item being transacted over the barcode scanner by reading the barcode affixed to the item. The barcode scanner may be operable to communicate with the computer for further processing of the item identifier number. The barcode scanner may be of any type capable of sensing or reading the barcode in order to scan and record items being transacted over the checkout terminal.

In one embodiment, the barcode scanner may be a laser-based scanner. In another embodiment, the barcode scanner may be an optical-based scanner. The optical-based scanner utilizes an image of the item to identify the barcode.

The item identifier number may be, for example, a stock keeping unit number (SKU) or product lookup number (PLU).

The camera may be positioned to capture an image of the item being transacted over the barcode scanner. The image may be captured such that it includes the barcode and a surrounding of the barcode. The camera may be operable to communicate with the computer for further processing of the captured image. The camera may be further capable of recording a video or a snippet of video while the checkout terminal is operational or while the checkout terminal is scanning multiple items during the transaction of the items. The snippet of video may comprise at least one image of the item. For example, the snippet of video may comprise multiple images or frames showing the item viewed from various angles.

In one embodiment, the camera and the barcode scanner may be integrated into the optical-based scanner. The optical-based scanner uses a digital imaging sensor or sensors to read barcodes in order to scan and record the item being transacted at the checkout terminal. As such, the optical-based scanner comprises the camera integrated therein.

The checkout terminal for detecting a fraudulent activity may comprise multiple cameras situated to capture the image of the item at multiple angles. For instance, the item may be affixed with multiple barcodes, in such instance, multiple cameras may work together to capture multiple images including the multiple barcodes affixed to the item.

In another embodiment, the camera may be positioned nearby the barcode scanner, such that detection of the barcode by the barcode scanner and image capture by the camera occur substantially at the same time.

In yet another embodiment, the camera may be an overhead camera which are positioned to provide a better view of the item during the transaction of the item at the checkout terminal.

The camera may be utilized to serve different functions, not limiting to the operational and functional embodiments disclosed herein. Similarly, the camera may be employed to serve more than one function, for example, to prevent other types of fraudulent activities that happen at the checkout terminal.

The storage unit may be operable to communicate with the checkout terminal and its components. The storage unit may receive images being taken by the camera for further verification of the fraudulent activity. The storage unit also may receive item identifier numbers from the barcode scanner for further verification of the fraudulent activity.

In particular, the storage unit may be accessible by the computer for comparing the image of the item captured during an instance of the transaction to an image that is expected by the item identifier number of the item of that instance. The steps and functions of the method for detecting a fraudulent activity utilizing the system and/or checkout terminal described above are further discussed herein.

Turning now to FIG. 1, an embodiment of the checkout terminal is provided. The checkout terminal 101 comprises the barcode scanner 103 integrated with the camera 104. Further, the checkout terminal 101 comprises the computer 102 having one or more processor, and a display 105. The barcode scanner 103 and the camera 104 are in communication with the computer 102. The checkout terminal 101 is in communication with the storage unit 107 via a network 106. The display may provide a computerized user interface for an attendant to monitor the transaction at the checkout terminal.

In one embodiments, the display may allow input and output relating to the steps and actions of the system and method described herein.

In another embodiment, the display may provide access to the data storage unit 107 via the network 106.

In some embodiments, a remote processor 109 maybe further in communication with the checkout terminal via the network. The remote processor 109 may further verify the fraudulent activity from a remote location or by employing a different method of verification. The verification of the fraudulent activity identified by the computer may be necessary to be confirmed, so that a false-positive verification of the fraudulent activity can be prevented. The remote processor 109, for example, may receive the image or a video from the camera for a human validation of the fraudulent activity.

In some embodiments, the checkout terminal 101 may be in further communication with an alert system 108. The alert system 108 may issue an alert when the fraudulent activity is confirmed by the computer. In one embodiment, the alert may be a visual alarm, such as light or other visual signals. In another embodiment, the alert may be an audible alarm. In yet another embodiment, the alert may be an alert message presented on the display. The display may be monitored by a cashier at the checkout terminal or an attendant in case the checkout terminal is a self-checkout terminal. Examples of the alert message may include, but are not limited to, a text message, email, or other electronic messages.

In a further embodiment, the alert may be initiated by halting the operation of the checkout terminal or the self-checkout terminal. Upon halting of the operation, a review of the alert may be required by the attendant. The review may be conducted by the attendant physically verifying the alert. The review also may be conducted by the attendant receiving a snippet of video sent to the checkout terminal or an attendant's remote processor. The snippet of video may be provided by the camera which includes at least a portion of the video recording the item during the transaction relevant in time to the fraudulent activity in question, possibly up to and including the entire transaction up to that point, in order for the attendant to quickly review what has occurred to trigger the alert.

In a further embodiment, the snippet of video may comprise at least one image of the item. For example, the snippet of video may comprise multiple images or frames showing the item viewed from various angles, making the review by the attendant easier. The snippet of video also may comprise the image captured by the camera. Further, the attendant may review the transaction, correct any errors, and allow the transaction to continue once the alert is resolved.

A method for detecting a fraudulent activity at a checkout terminal is provided. The method may be employed by the system and/or the checkout terminal provided above.

The method for detecting a fraudulent activity may begin with detecting the item identifier number of the item being transacted over the checkout terminal with the barcode scanner. The item identifier number of the item may be detected by reading the barcode affixed to the item. The barcode scanner may be operable to communicate with the computer. The image of the item may be captured with the camera positioned at the checkout terminal. In one embodiment, the image may be captured such that it includes the barcode of the item and the surrounding of the barcode.

Further, the computer may obtain a visual signature from the image. In one embodiment, the interesting point may be automatically chosen by the interest operator. The interest operator is an image processing functions that detect interesting locations within an image.

In another embodiment, the visual signature may be obtained by detecting an interesting point from the image using an interest operator. The interesting point may be located in the surrounding of the barcode captured in the image. The visual signature may be obtained by detecting a plurality of interesting points. The interest operator may be any combination of a corner detector, an edge detector, and an area of high texture. These interest operator provides visual features unique to the item in addition to the barcode. In yet another embodiment, the visual features may include scale-invariant feature transform (SIFT) or speeded up robust features (SURF) features, which are rotationally and scale invariant. Other visual features, may include, but are not limited to, affine invariant features, histogram based approaches, image-based features (e.g. image patches), and the like.

The computer may determine a similarity between the visual signature and a model visual signature to verify whether the item being analyzed has been fraudulently tempered. The similarity may be determined by comparing the visual signature from the image to the model visual signature linked to the item or the item identifier number. The model visual signature represents an expected visual signature of the item which may be accessible from the storage unit.

In one embodiment, the model visual signature may be obtained by collecting a group of visual signatures from the item. As the item is transacted multiple times over the checkout terminal in a period of time, the visual signatures from each of the transactions of the item may be collected. Once collected, a probabilistic model of the group of visual signatures may be calculated to obtain the model visual signature that can be compared against the visual signature of the item as the item is transacted post obtainment of the model visual signature.

In one embodiment, the probabilistic model may be a statistical model retrieved from the group of visual signatures. In general, it is understood that "model" can refer to any piece of data, statistical or otherwise, that is used to compare the current instance of an item's visual signature with what is expected of that item (model visual signature). As such, in some embodiments, the probabilistic model may be a nonparametric probabilistic model.

The nonparametric probabilistic model of the group of visual signature may be calculated to obtain the model visual signature that can be compared against the visual signature of the item as the item is transacted post obtainment of the model visual signature. By way of a non-limiting example, a nonparametric probabilistic model can be constructed by collecting ten of the visual signatures from the most recent transactions of the item. The similarity of a new visual signature from a subsequent item can be determined by first comparing the new visual signature to each of the ten visual signatures within the nonparametric probabilistic model. As a result, ten similarities can be gathered from each of the ten comparisons. The least different similarity among the ten similarities can then be used as the similarity for the subsequent item. Thus, the nonparametric probabilistic model is the visual signature corresponding to the least different similarity among the ten. Various other similarity measures can be applied as well, including median, mean, etc. Furthermore, various approaches to collecting the models can also be employed in a nonparametric strategy.

In another embodiment, statistically, a probability that the visual signature is sampled from the model visual signature may be determined by using a likelihood estimate. This is measured mathematically as P(D IM), probability of observing this data, D, given the model M. This constitutes a most likely, or ML, estimate. This is related in many cases to taking a simple difference of the visual signature in comparison to the model visual signature. In the case where the model visual signature may be just an average of the appearances of various visual signatures seen over time, and the visual signatures are image patches, this is exactly what the likelihood estimate consists of. The likelihood estimate can then be compared with a threshold value. It can also be compared with likelihood estimate taken from one or more of the other model visual signatures stored in the data storage unit in order to determine which model visual signature the current visual signature is most likely to have been sampled from. This is related to the maximum a-posteriori estimate of the data, $$P(M|D)=P(D|M)P(M)/\Sigma_i P(D|M_i)P(M_i)$$

From this, one can see the ML estimate, P(D IM), is used in this calculation, but it is used in conjunction with calculation of the likelihood estimate taken from all the other visual signature models over which one wishes to compare it with.

In yet another embodiment, the probabilistic model may be obtained by taking an average of the group of visual signatures which takes an average of the appearances of various visual signatures collected over the period of time.

In a further embodiment, the model visual signature may be approximated according to Gaussian distribution. In this embodiment, the similarity may be examined by a threshold value, where the threshold value represents a boundary of acceptable similarity range within the Gaussian distribution gathered from the group of visual signatures. Thus, the threshold value may set a maximum allowed difference in the similarity.

A size of the group of visual signature required to obtain an accurate model visual signature may vary. Similarly, the size of the group of visual signatures required to begin measuring the similarity may vary. In one embodiment, the size of the group of visual signatures may be determined by a measure of variances among the collected group of visual signatures. The measure of variances may represent how self-similar the collected visual signatures are as the item is transacted multiple times over the checkout terminal in a period of time. If they are sufficiently similar or the measure of variance is low, then a smaller size of the group may be needed to build an effective model visual signature. Likewise, if the collected visual signatures are quite dissimilar or the measure of variance is high, it may take more samples in order to build an effective model visual signature.

In one embodiment, the measure of variance to determine the size of the group of visual signatures can be accomplished by using online methods of learning the parameters of a Gaussian distribution, using the magnitude of the variances to determine the spread or cohesiveness of the collected group of visual signatures.

In another embodiment, the size of the group of visual signatures may be determined by setting a predetermined size of the group of visual signatures. In this embodiment, the model visual signature is obtained and applied to measure the similarity, once the predetermined size of the group of visual signatures are collected.

A further maintenance of the model visual signature may be continuously undertaken as more of the visual signature of the same item is obtained over a period of time. In one embodiment, the visual signature obtained, at each instance of transactions of the item over the checkout terminal, may be added to the group of visual signatures to update the model visual signature continuously. This embodiment may only apply if verification of the fraudulent activity yields false, in other words, the visual signature matches the model visual signature.

In another embodiment, the computer may reset the group of visual signatures. In case where the model visual signature is deemed inaccurate the reset may be needed. In this embodiment, the computer may being to reset the group of visual signatures when a predetermined number of occasions indicating a mismatch between the visual signature and the model visual signature has been observed. The reset may begin by discarding the current model visual signature and rebuilding the group of visual signatures. The reset may begin to take place, while the currently active model visual signature continues to apply to determine the similarity. Once an accurate and new model visual signature is obtained from the reset, the currently active model visual signature may be replaced with the one created by the reset.

The method for detecting a fraudulent activity may further involve the alert system. When the visual signature of the item does not match the model visual signature, in other words, when the similarity determines that the visual signature is not within the acceptable similarity range, the computer may issue an alert. The similarity may be verified against the threshold value. The threshold value may represent represents a boundary of acceptable similarity range within the Gaussian distribution gathered from the group of visual signatures. The threshold value also may be an absolute measurement of similarity which sets the maximum allowed difference against the model visual signature.

The method for detecting a fraudulent activity may further involve the remote processor. The remote processor may further verify or preliminarily verify the fraudulent activity prior to issuing the alarm.

In one embodiment, the remote processor may receive the image for a human validation of the fraudulent activity. Once received, the human validation may take place by a human to determine the veracity of the fraudulent activity at a remote location having access to the remote processor. The result of the human validation may be sent back to the computer.

In another embodiment, the snippet of video may be sent to the remote processor by the computer for the human validation. The snippet of video may comprise at least one image of the item. For example, the snippet of video may comprise multiple images or frames showing the item viewed from various angles.

In yet another embodiment, the human validation may be requested to the remote processor by the computer based on a confidence score. The confidence score may represent a degree of difference between the visual signature and the model visual signature.

The human validation can be considered an extension of the matching process itself rather than a distinct step. Thus, if the optional human validation step is undertaken, then the result of that decision is taken as the ultimate result of the verification process. This is particularly useful in the case in which the verification process carried by the computer as described above shows a negative match, but the human validation step shows a positive match. In this case, not only is a false alert prevented, but the visual signature of such instance can then be used to update the model visual signature.

The method for detecting a fraudulent activity may further comprise correcting the image into a canonical view. In order to facilitate the creation of the visual signature, correcting image distortions in the image may be necessary. Correcting the image distortions may help to extract and compare the visual features or the interesting points within the surrounding of the barcode, by creating a uniform perspective with which to base the comparison against the model visual signature. Examples of image distortions may include, but are not limited to, scale distortion, rotational distortion, projective distortion, and barrel distortion. The canonical view may be obtained by applying a transform to compensate for the image distortions.

In one embodiment, the transform may be identified by comparing a size and shape of the barcode in the image to a predetermined reference size and shape of the barcode. The predetermined reference size and shape corresponding to the identifier number may be stored at the storage unit and accessible to the computer.

In another embodiment, the size and shape of the barcode in the image may be determined by fitting a bounding box around the barcode within the image. The bounding box need not be axis-aligned.

In yet another embodiment, the size and shape of the barcode in the image may be determined by identifying at least two corner points of the barcode and their relations between the two within the image.

In yet another embodiment, the size and shape of the barcode in the image may be determined by calculating a parameter of a plane on which the barcode resides.

The barcode may be affixed to the item in more than one location. Item packaging often contains more than one barcodes. This allows barcode scanners to scan items when the item can be in many different orientations with respect to the barcode scanner or the camera. Thus, multiple model visual signature may be required to accommodate the many different orientations. This may be achieved by using typical multi-modal statistical methods.

By way of example, if an item has two barcodes on its packaging, the model visual signature obtained will be bimodal. Likewise, if it has three barcodes, the model visual signature obtained will be trimodal, There are many number of methods known in the art to achieve this, including mean-shift, minimum description length, expectation maximization approaches, etc.

Furthermore, a number can simply be chosen for how "modal" the distribution should be. For this, a simple k-means classification scheme can be used, where k is the chosen number of modes, or barcodes, on the item. In many scenarios, this is often the better choice, as often times there may be multiple barcodes on the packaging, though one or two may get the majority of the scans. Furthermore, selecting a value of k that is only slightly too high does not typically create poor models, as the one or two superfluous modes are simply starved out. Again, these approaches to statistical modeling would be apparent to those having ordinary skill in the art.

Figure 2:
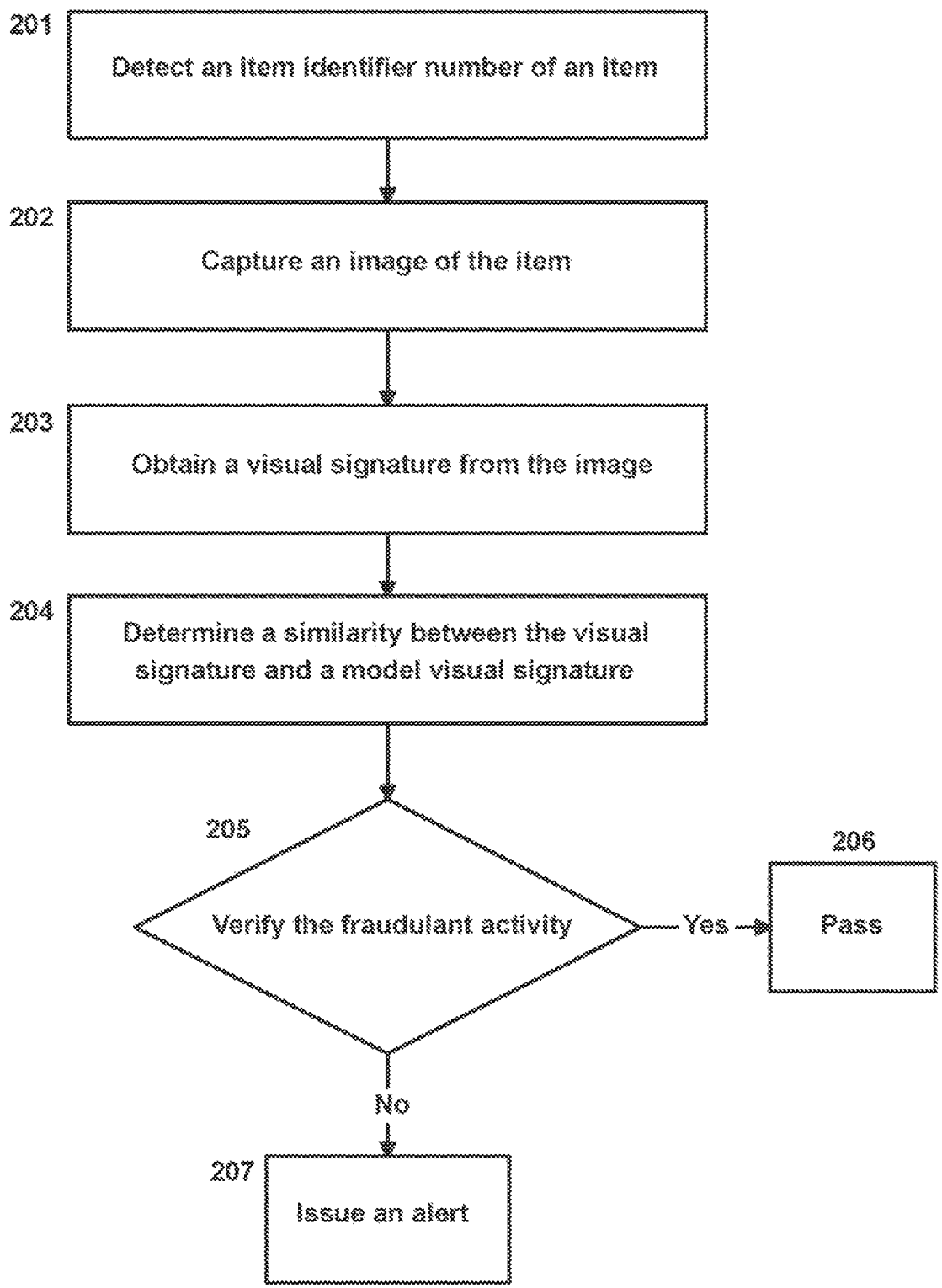
FIG. 2 provides a flowchart showing an embodiment of the method for detecting a fraudulent activity at the checkout terminal.
Figure 3:
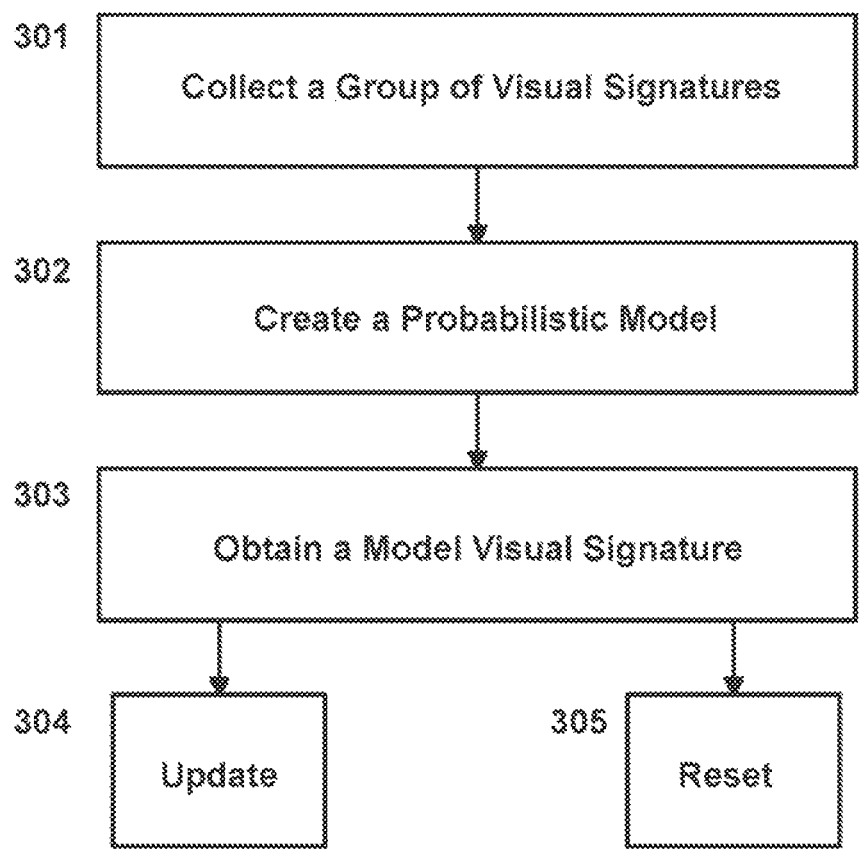
FIG. 3 provides a flowchart of an exemplary embodiment over viewing the steps involved in obtaining the model visual signature.

FIG. 2 shows a flow chart of an embodiment of the method for detecting a fraudulent activity at the checkout terminal. In step 201, the computer detects an item identifier number of an item. Then the camera captures an image of the item 202. From the captured image, the computer further obtains a visual signature from the image 203. The visual signature obtained from step 203 is then compared with the model visual signature to determine the similarity between the visual signature and the model visual signature 204. At 205, the fraudulent activity is verified by matching the visual signature and the model visual signature. If they match the computer passes 206 the item being transacted. If not, the computer issues the alert 207, FIG. 3 shows a flow chart of an exemplary embodiment overviewing the steps involved in obtaining the model visual signature. At 301, the group of visual signatures is collected by the camera and stored in the storage unit, Once the group of visual signatures is collected, the computer creates the probabilistic model 302. Then, the model visual signature is obtained 303 by various methods described above. The obtained model visual signature may further be updated 304 by adding additional visual signature to the group or be reset 305 if the obtained model visual signature is in accurate.

Figure 4:
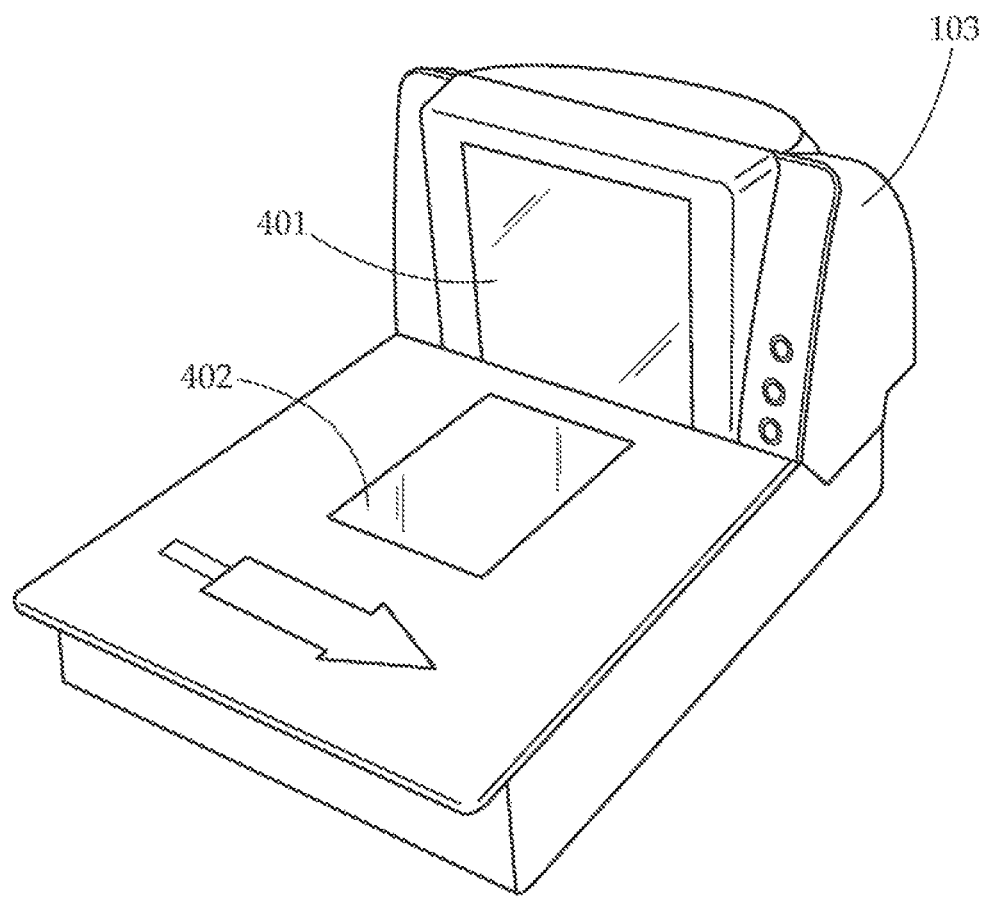
FIG. 4 provides an exemplary embodiment of the barcode scanner.

FIG. 4 illustrates an exemplary embodiment of the barcode scanner. In this exemplary embodiment, the barcode scanner 103 comprises two glass panels 401 402 positioned to face the item at the bottom or the side. The glass panels 401 402 can hold the camera therein to capture the image of the item as its barcode is scanned through either of the two glass panels 401 402.

Figure 5:
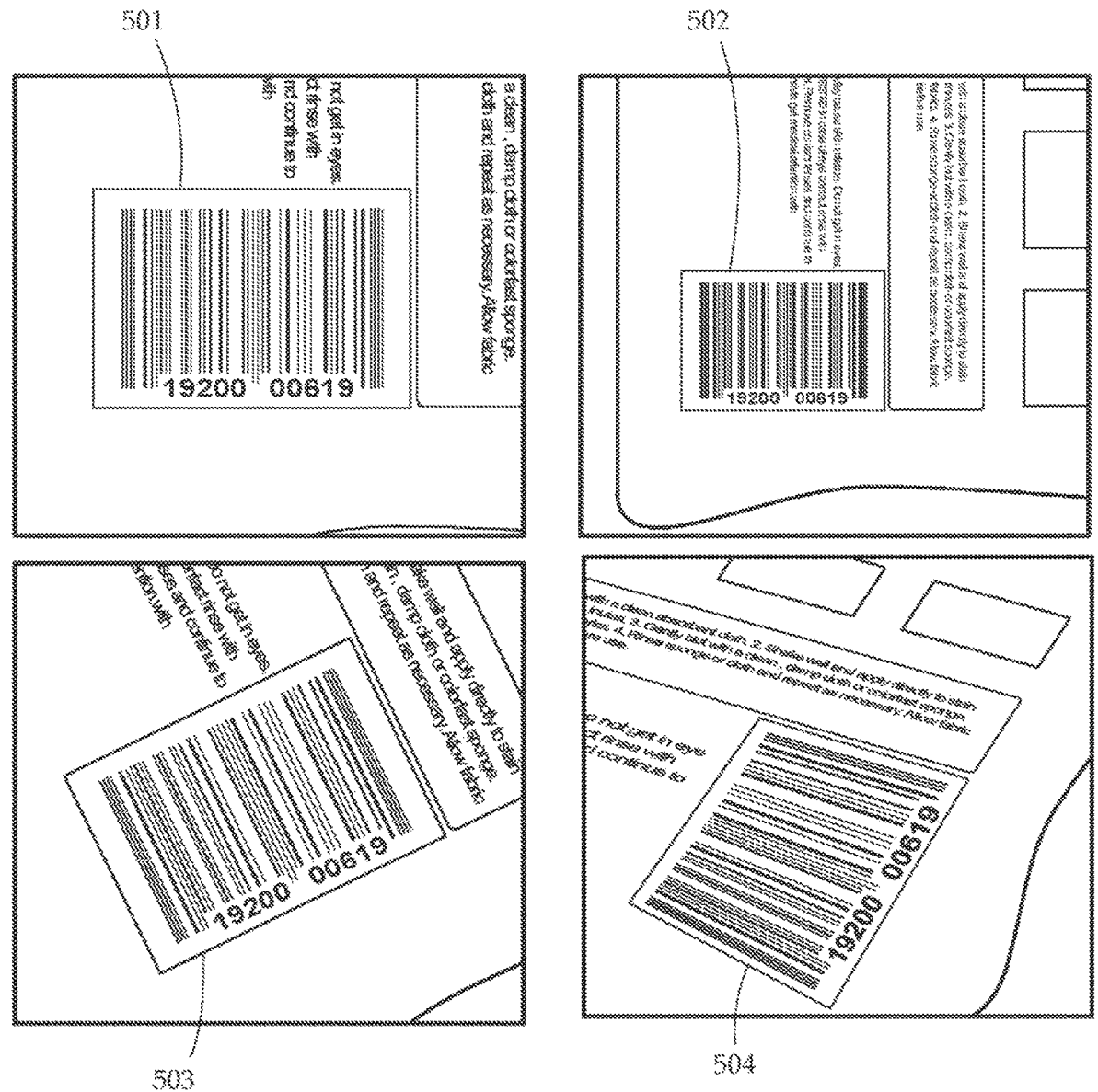
FIG. 5 provides examples of image distortions.

FIG. 5 shows examples of image distortions. The image shown in 501 represents the canonical view of the image containing the barcode and the surrounding at its predetermined reference size and shape. In this image the barcode reads from left to right. As shown in 502, the image may contain the scale distortion. An example of the rotational distortion is shown in 503. Lastly, example of the projective distortion is shown in 504.

FIG. 6-9 illustrate exemplary embodiments of correcting the image into the canonical view.

Figure 6:
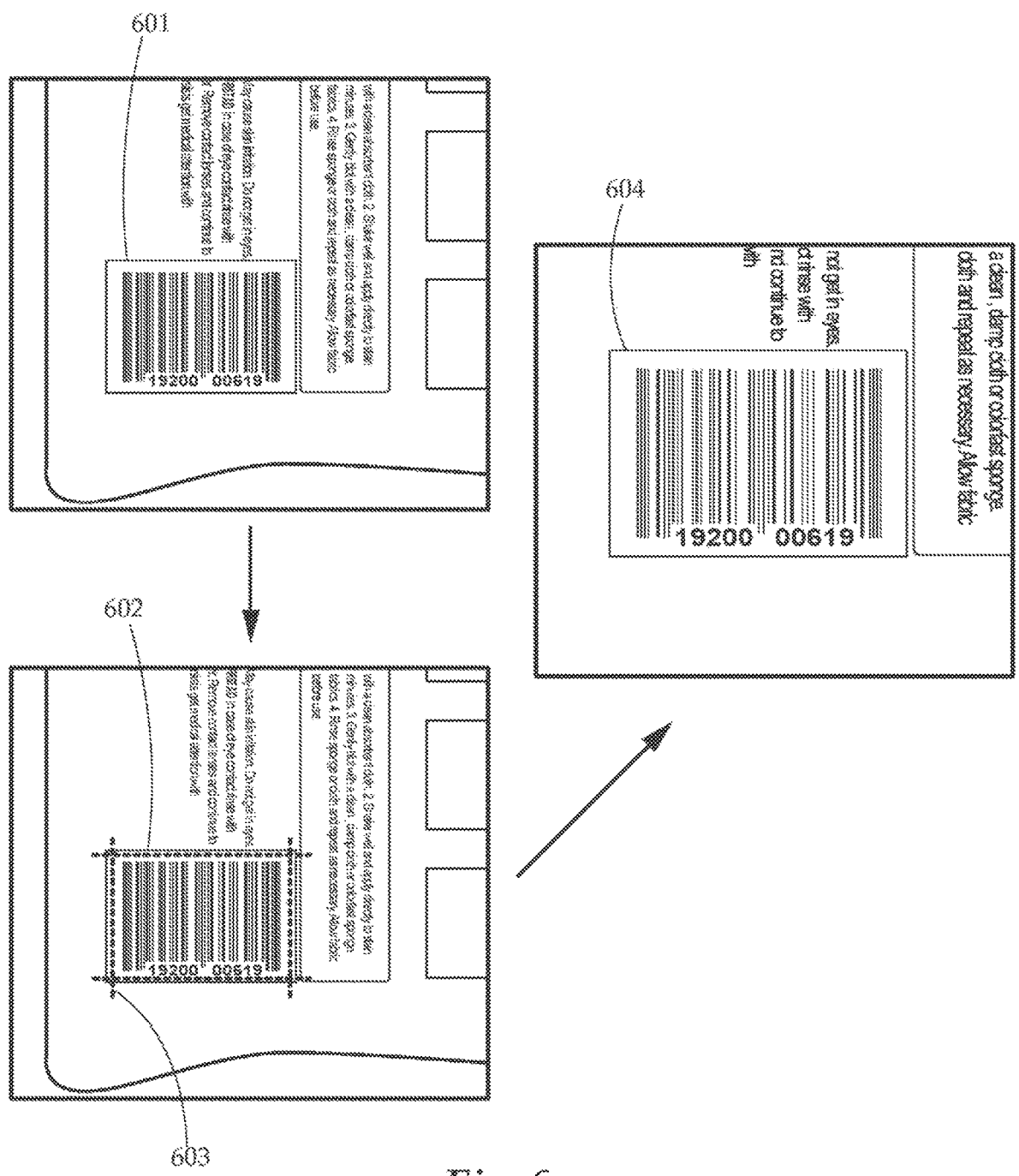
FIG. 6 provides an exemplary embodiments of correcting the scale distortion.

In FIG. 6, the image 601 is distorted with a scale distortion, To correct the scale distortion from the image, a scale transform can be applied to the image 601. At 602, the scale transform is identified by first fitting the bounding box 603 around the barcode within the image to determine the size and shape of the barcode in the image. Then the size and shape of the barcode in the image is compared to the predetermined reference size and shape of the barcode corresponding to the item identifier number to calculate the scale transform. The image at 604 shows the image with the scale distortion removed by applying the scale transform to the image 601.

Figure 7:
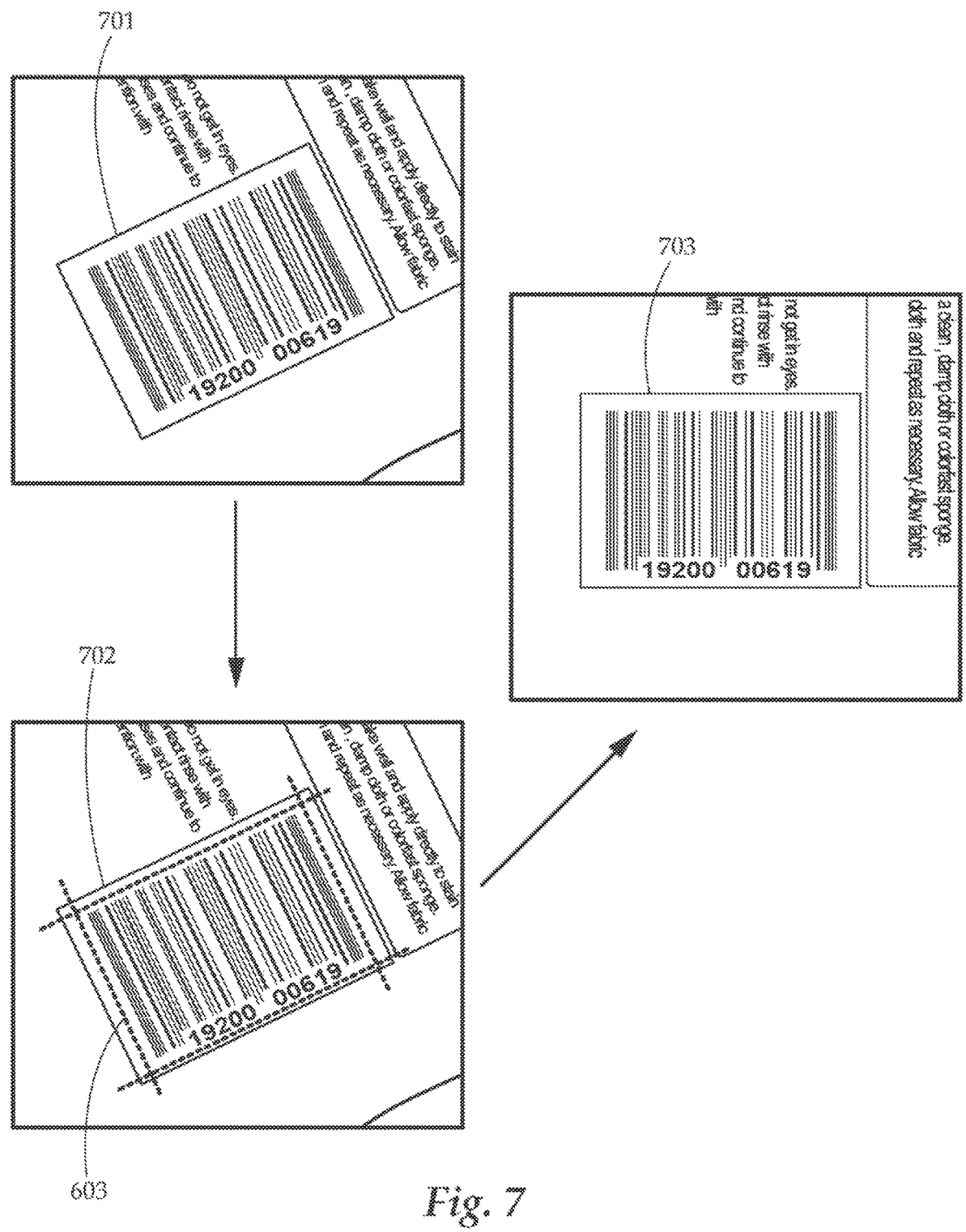
FIG. 7 provides an exemplary embodiments of correcting the rotational distortion.

In FIG. 7, the image 701 is distorted with a rotational distortion. To correct the rotational distortion from the image, a rotational transform can be applied to the image 701. At 702, the rotational transform is identified by first fitting the bounding box 603 around the barcode within the image to determine the size and shape of the barcode in the image. Then the size and shape of the barcode in the image is compared to the predetermined reference size and shape of the barcode corresponding to the item identifier number to calculate the rotational transform. The image at 703 shows the image with the rotational distortion removed by applying the rotational transform to the image 701.

Figure 8:
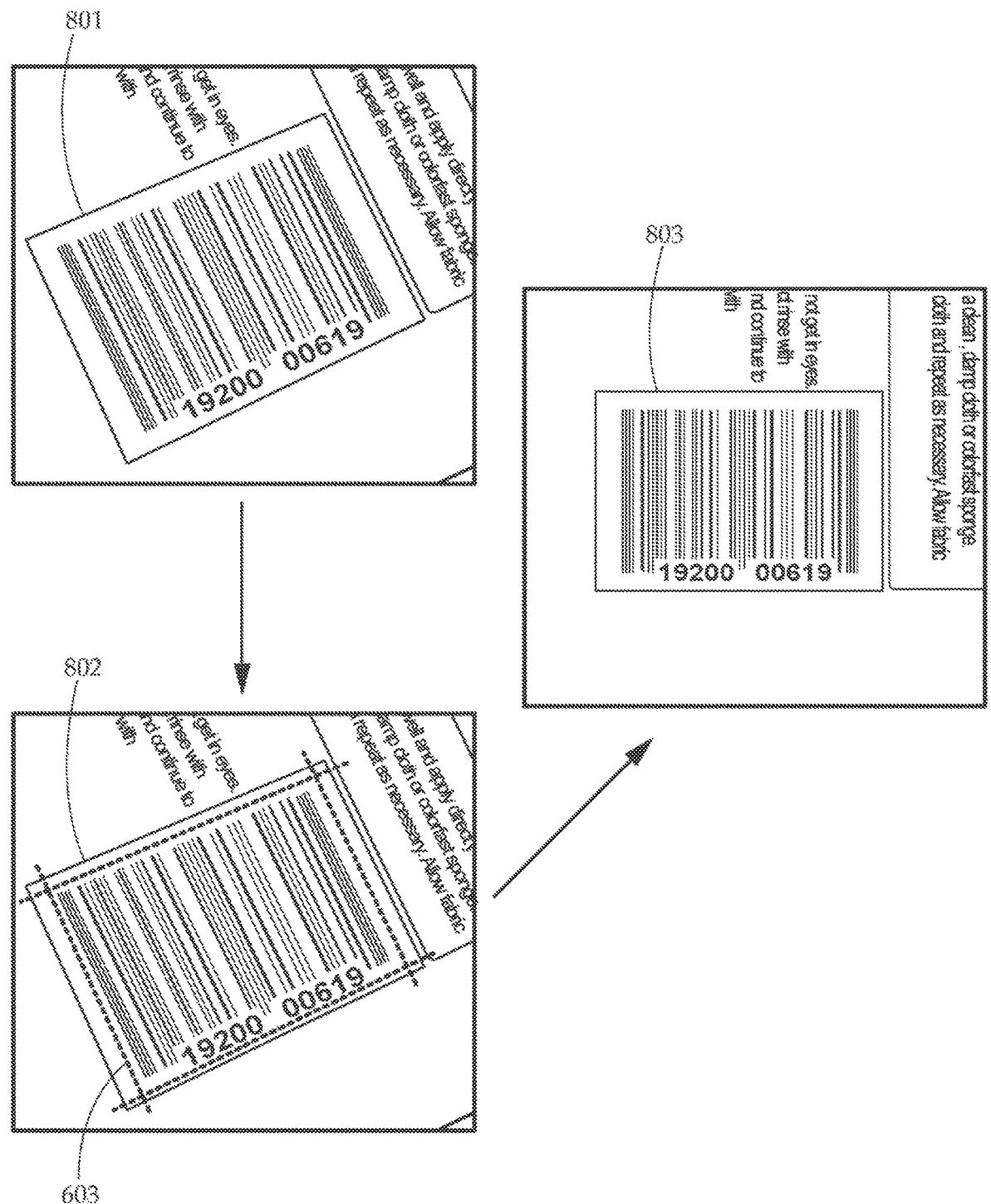
FIG. 8 provides an exemplary embodiments of correcting the affine distortion.

In FIG. 8, the image 801 is distorted both with a scale distortion and a rotational distortion. The combination of the scale distortion and the rotational distortion results in the affine distortion. To correct the affine distortion, both rotation and scale, from the image, the affine transform can be applied to the image 801. At 802, the affine transform is identified by first fitting the bounding box 603 around the barcode within the image to determine the size and shape of the barcode in the image. Then the size and shape of the barcode in the image is compared to the predetermined reference size and shape of the barcode corresponding to the item identifier number to calculate the affine transform. The image at 803 shows the image with the affine distortion removed by applying the affine transform to the image 801.

Figure 9:
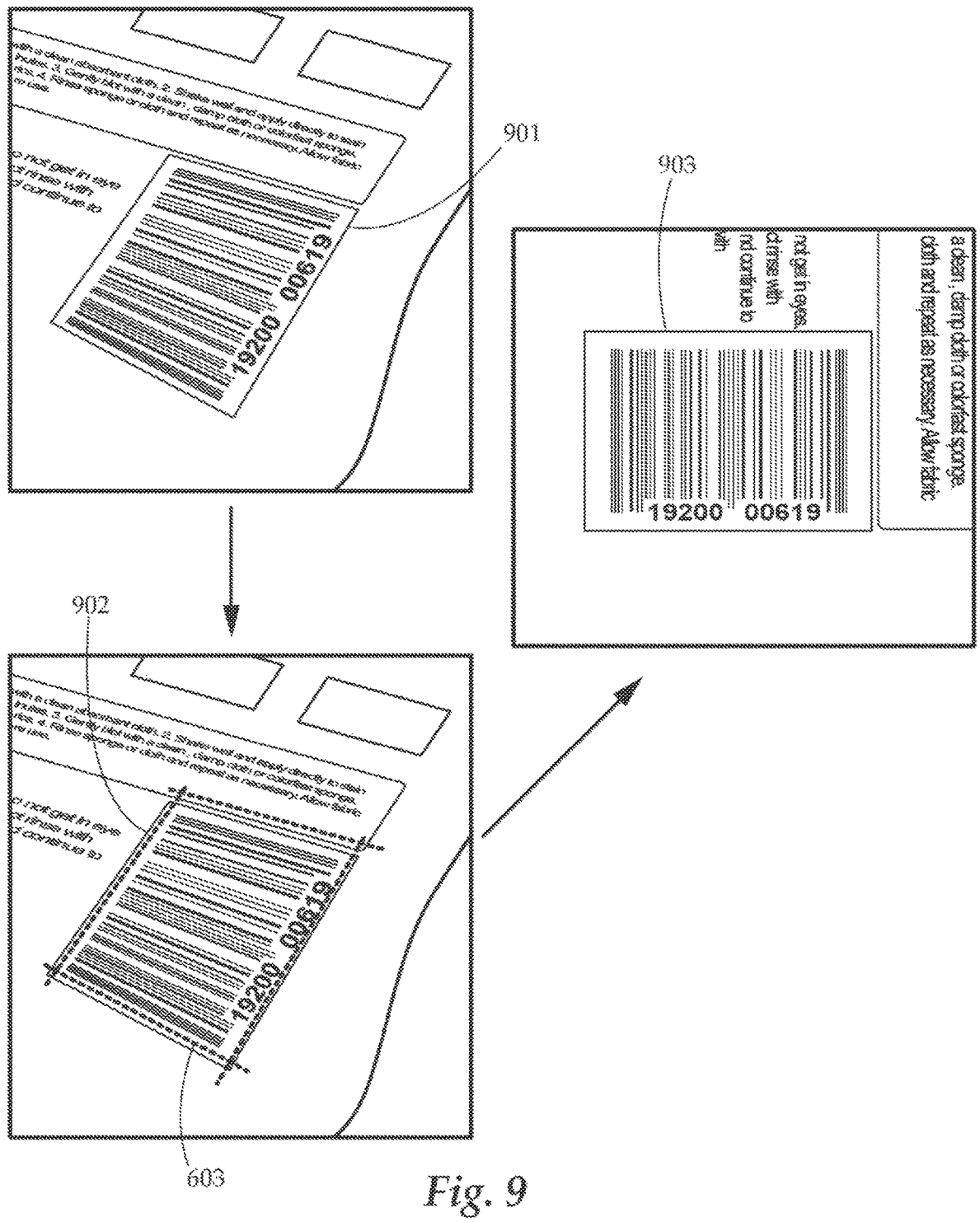
FIG. 9 provides an exemplary embodiments of correcting projective distortion.

In FIG. 9, the image 901 is distorted with a perspective distortion. To correct the perspective distortion, the parameter of a plane on which the barcode resides on the image is calculated. This process is also called ground plane rectification. Once the barcode is fitted with the bounding box 603 at 902, the projective transform can be obtained by comparing the size and shape of the barcode in the image to the predetermined reference size and shape of the barcode corresponding to the item identifier number. The projective transform is applied to the image at 901 to arrive at the canonical view 903.

Figure 10:
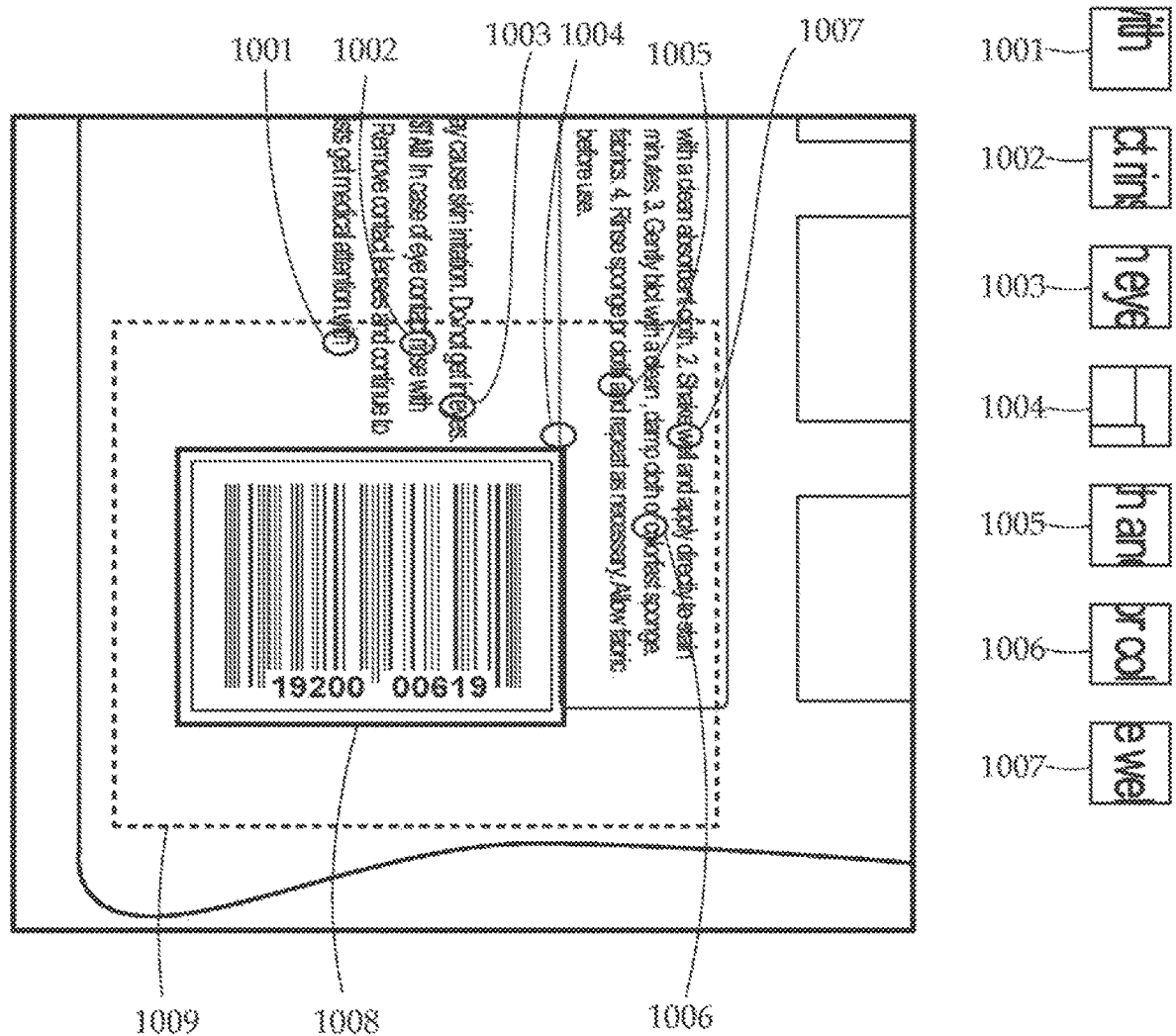
FIG. 10 provides an exemplary embodiment of the visual signature.

FIG. 10 illustrates an exemplary embodiment of the visual signature. The detected barcode 1008 obtained from the image by either the camera or the optical-based scanner is identified. In the surrounding of the barcode 1009, a plurality of interesting points (1001 1002 1003 1004 1005 1006 1007) are detected by the computer. In this exemplary embodiment, the visual signature comprises the plurality of interesting points, the barcode, and locations of each of the plurality of interesting points relative to the barcode.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

What is claimed is:

1. A method, comprising:
    identifying, from an image, interesting points surrounding an item identifier for an item, wherein the interesting points are on a packaging of the item;
    calculating a signature for the item identifier based on the interesting points;
    verifying the signature matches a model signature for the item identifier; and
    raising an alert during a transaction associated with the item when the signature does not match the model signature based on the verifying.

2. The method of claim 1 further comprising, recording a video of the transaction as the item is processed at a terminal during a checkout.

3. The method of claim 2, wherein recording further includes creating a video snippet from the video comprising a portion of the video when the item was processed during the transaction.

4. The method of claim 3, wherein creating further includes linking the video snippet to the alert.

5. The method of claim 1, wherein verifying further includes retaining the signature with a group of acceptable signatures for the item identifier when the signature matches the model signature, wherein the group of acceptable signatures are accumulated for previous transactions associated with the item, and updating the model signature based on adding the signature to the group of acceptable signatures.

6. The method of claim 1, wherein verifying further includes comparing the interesting points against an average of other interesting points represented by the model signature.

7. The method of claim 1, wherein verifying further includes comparing the interesting points against a threshold boundary of a range represented by the model signature.

8. The method of claim 1, wherein verifying further includes comparing the interesting points against a predefined variance represented by the model signature.

9. The method of claim 1, wherein raising further includes sending the alert to an alert system.

10. The method of claim 1, wherein raising further includes activating a light, generating a visual signal, playing an audible alarm, presenting a message on a display associated with a terminal, sending a text message, sending an email message.

11. A method, comprising:
monitoring items being processed by a terminal as the items are scanned at the terminal during a checkout;
capturing images of the items as they are scanned and for each image:
identifying an item identifier associated with the corresponding item and interesting points that surround the item identifier, wherein the interesting points are on a packaging of the item;
calculating an item signature from the interesting points;
comparing the item signature against a model item signature for the corresponding item; and
generating an alert during the transaction when the item signature does not match the model item signature.

12. The method of claim 11, wherein identifying the item identifier for each image further includes selecting the interesting points from the image as features associated with a corner, an edge, and an area of high texture depicted in the image for the corresponding item.

13. The method of claim 11, wherein identifying the item identifier for each image further includes adding other interesting points included within the item identifier from the image to the interesting points.

14. The method of claim 11, wherein identifying the item identifier for each image further includes selecting the interesting points from the image as scale-invariant feature transform features associated with the interesting points.

15. The method of claim 11, wherein identifying the item identifier for each image further includes selecting the interesting points from the image as affine invariant features associated with the interesting points.

16. The method of claim 11, wherein identifying the item identifier for each image further includes selecting the interesting points from the image as speeded up robust features associated with the interesting points.

17. The method of claim 11 wherein identifying the item identifier for each image further includes selecting the interesting points from the image as image histogram features associated with the interesting points.

18. The method of claim 11, wherein the alert for each image further includes linking a video snippet to the alert, wherein the video snippet corresponding to the image and representing when the corresponding item was scanned at the terminal during the transaction.

19. A device, comprising:
a processor;
a non-transitory computer-readable storage medium having executable instructions; and
the executable instructions when executed by the processor from the non-transitory computer-readable storage medium cause the processor to:
obtaining interesting points that surround an item identifier from an image captured of the item during a transaction at a terminal when the item is scanned at the terminal for the transaction, wherein the interesting points are on a packaging of the item;
combining the interesting points with other points associated with the item identifier;
calculating a signature for the item based on the interesting points and the other points;
comparing the signature against a model signature associated with the item identifier; and
raising a transaction alert during the transaction when the signature does not match the module signature for transaction intervention.

20. The device of claim 19, wherein the item identifier is a barcode, a stock keeping unit number (SKU) or a product lookup number (PLU).

* * * * *